United States Patent
Köse et al.

(10) Patent No.: US 10,745,025 B2
(45) Date of Patent: Aug. 18, 2020

(54) METHOD AND DEVICE FOR SUPPORTING A VEHICLE OCCUPANT IN A VEHICLE

(71) Applicant: VOLKSWAGEN AG, Wolfsburg (DE)

(72) Inventors: Esref Köse, Bochum (DE); Ahmed Ali, Bochum (DE); Sebastian Gehrling, Essen (DE); Jens Kampermann, Haan (DE); Sarah Strygulec, Wuppertal (DE); Sven Klomp, Uetze/Dollbergen (DE); Jessica Apfel, Paderborn (DE); Sandra Jürgensmeier, Delbrück (DE); Wolfgang Theimer, Bochum (DE); Ernst Zielinski, Bochum (DE)

(73) Assignee: Volkswagen AG (DE)

( * ) Notice: Subject to any disclaimer, the term of this patent is extended or adjusted under 35 U.S.C. 154(b) by 235 days.

(21) Appl. No.: 15/976,985

(22) Filed: May 11, 2018

(65) Prior Publication Data

US 2018/0339713 A1 Nov. 29, 2018

(30) Foreign Application Priority Data

May 29, 2017 (DE) .................. 10 2017 208 971

(51) Int. Cl.
*B60W 50/10* (2012.01)
*B60W 50/08* (2020.01)
*B60W 50/00* (2006.01)

(52) U.S. Cl.
CPC .......... *B60W 50/10* (2013.01); *B60W 50/085* (2013.01); *B60W 2050/0062* (2013.01);
(Continued)

(58) Field of Classification Search
CPC ............... B60W 50/10; B60W 50/085; B60W 2050/0062; B60W 2050/0089;
(Continued)

(56) References Cited

FOREIGN PATENT DOCUMENTS

DE 10126224 A1 12/2002
DE 10343683 A1 4/2005
(Continued)

OTHER PUBLICATIONS

Search Report for European Patent Application No. 18155937.8; dated Oct. 8, 2018.

(Continued)

*Primary Examiner* — Maceeh Anwari
(74) *Attorney, Agent, or Firm* — Barnes & Thornburg LLP

(57) ABSTRACT

A method for assisting a transportation vehicle occupant located in a transportation vehicle wherein user information regarding the behavior and/or the state of a transportation vehicle occupant and transportation vehicle parameters of the transportation vehicle are gathered. The gathered user information and transportation vehicle parameters are combined and jointly analyzed and at least one behavior pattern of the transportation vehicle occupant is determined from the jointly analyzed user information and transportation vehicle parameters. The behavior pattern is stored together with the user information. In a subsequent gathering of user information, this user information is compared with the user information behavior pattern previously stored. When there is conformance with the behavior pattern, a transportation vehicle function is automatically carried out.

20 Claims, 2 Drawing Sheets

(52) U.S. Cl.
CPC . *B60W 2050/0089* (2013.01); *B60W 2540/22* (2013.01); *B60W 2710/18* (2013.01); *B60W 2710/20* (2013.01); *B60W 2710/305* (2013.01)

(58) Field of Classification Search
CPC ......... B60W 2540/22; B60W 2710/18; B60W 2710/305; B60W 2710/20; B60W 40/00; B60W 40/08
USPC .......................................................... 701/36
See application file for complete search history.

(56) References Cited

FOREIGN PATENT DOCUMENTS

| DE | 102012004601 A1 | | 10/2012 |
|---|---|---|---|
| DE | 102011055685 A1 | | 5/2013 |
| DE | 102013210050 A1 | | 12/2013 |
| DE | 102012221036 A1 | * | 5/2014 |
| DE | 102012221036 A1 | | 5/2014 |
| DE | 102013217552 A1 | | 3/2015 |
| DE | 102014201036 A1 | | 7/2015 |
| DE | 102014216168 A1 | | 2/2016 |
| DE | 102014018913 A1 | | 6/2016 |
| DE | 112014003831 T5 | | 6/2016 |
| DE | 102015122603 A1 | | 7/2016 |
| DE | 102015208570 A1 | | 11/2016 |
| EP | 1284432 A1 | | 2/2003 |
| GB | 2532457 A | | 5/2016 |
| JP | H10255016 A | | 9/1998 |
| KR | 20130058581 A | | 6/2013 |
| KR | 20140002373 A | | 1/2014 |
| KR | 20150066308 A | | 6/2015 |

OTHER PUBLICATIONS

Search Report for German Patent Application No. 10 2017 208 971.7; dated Dec. 4, 2017.

* cited by examiner

METHOD AND DEVICE FOR SUPPORTING A VEHICLE OCCUPANT IN A VEHICLE

PRIORITY CLAIM

This patent application claims priority to German Patent Application No. 10 2017 208 971.7, filed 29 May 2017, the disclosure of which is incorporated herein by reference in its entirety.

SUMMARY

Illustrative embodiments relate to a method for assisting a transportation vehicle occupant located in a transportation vehicle. Illustrative embodiments also relate to a device for carrying out the disclosed method and to a transportation vehicle which is configured for carrying out the disclosed method or which comprises the disclosed device.

BRIEF DESCRIPTION OF THE DRAWINGS

Further features of the disclosure are apparent from the following description and the claims in conjunction with the figures, in which:

DETAILED DESCRIPTION

Figure 1:
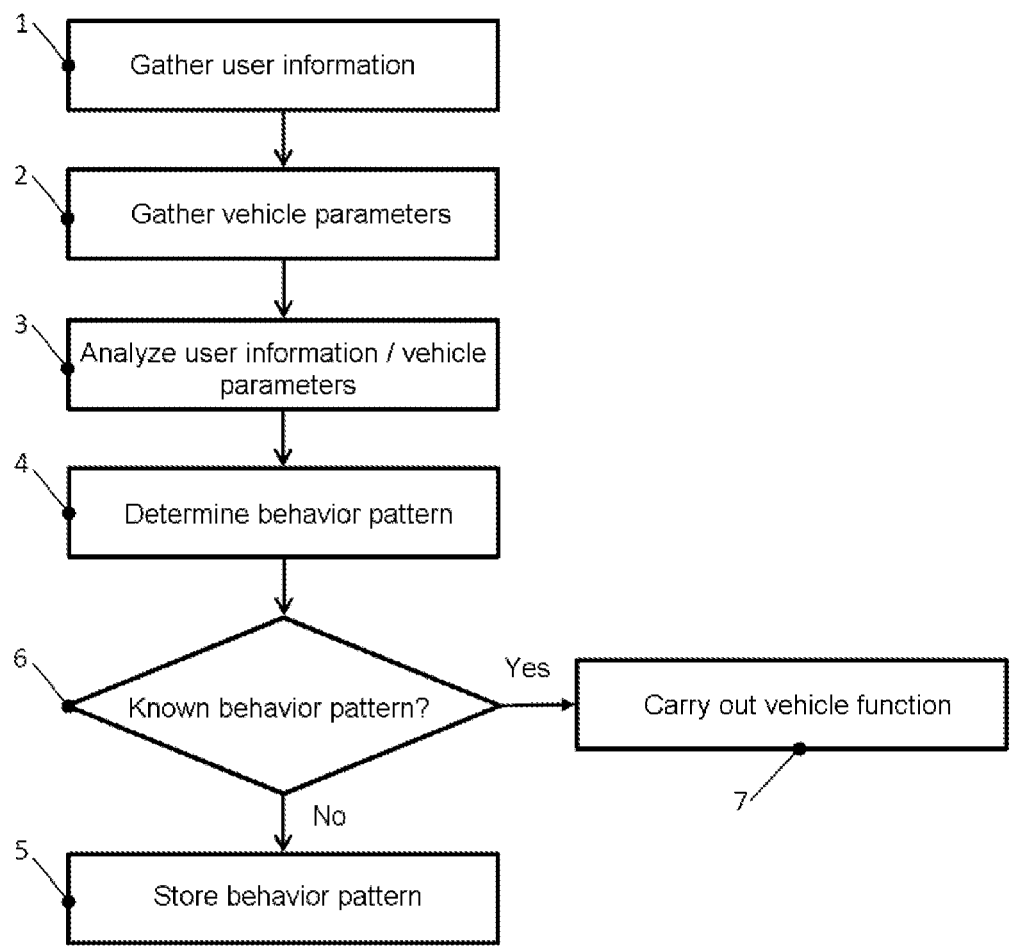
FIG. 1 schematically shows a method for assisting a transportation vehicle occupant located in a transportation vehicle.

A plurality of different types of assistance systems which can assist the driver in motorized transportation vehicles have become known. In some cases, the assistance systems are limited only to signaling or warning functions, and in some cases the assistance systems intervene into the drive or the control of the transportation vehicle. Knowledge of the present transportation vehicle situation is required in both cases, which is obtained on the basis of data from suitable sensors. The sensors can ascertain, in this case, technical parameters of the transportation vehicle itself, such as for a driving stabilization system (ESP) or anti-lock system (ABS), as well as information regarding the transportation vehicle surroundings. Various techniques are utilized in this case, frequently also in combination, for observing the transportation vehicle surroundings and assistance functions based thereon, such as parking assistance systems, automatic distance warnings and distance regulating functions, traffic sign recognition, blind spot monitoring, or emergency braking systems for pedestrian protection. Frequently, ultrasonic, radar, LIDAR, and camera systems are utilized for identifying objects in the surroundings of the transportation vehicle, such as pedestrians, other transportation vehicles, traffic signs, etc. In this case, the sensor data from multiple sensors can be combined or linked, to improve the quality of the gathered information. If the information gathered from one or several sensors is not reliable, for example, this information can be partially or completely compensated for by data from further sensors. Likewise, however, information which is already available can also be confirmed by data from further sensors.

In addition, sensors can be provided in the transportation vehicle, which gather information regarding the behavior and/or the state of a transportation vehicle occupant, in particular, the driver. By using a camera situated in the transportation vehicle interior, the head and eye position of the driver can be detected and, by suitable image-analysis methods, the viewing direction of the driver can be ascertained or it can be detected that the driver is becoming fatigued.

DE 10 2015 122 603 A1 discloses a driver assistance system comprising a camera directed at the driver, to record the face of the driver, especially the eyes of the driver, and, based on the viewing direction, to monitor whether the driver is distracted or is looking away from the road. If the driver is looking away from the road, a driver status module detects an abnormal situation and activates the driver assistance system. Likewise, the driver status module can establish whether the driver is sleepy or awake, based on how wide and for how long the eyes of the driver are open.

Similarly, GB 2532457 A describes determining, with the aid of an image sensor, the attentiveness of the driver depending on the amount of time the driver looks at the road or looks away from the road and, based thereon, controlling the sensitivity of a driver assistance system.

DE 10 2014 201 036 A1 describes an image-based classification method for ascertaining the driver state and/or the driver behavior, to ascertain the capability of a driver to take over. For this purpose, cameras are arranged in such a way that the eyes of the driver can be detected given any orientation of the head, to ascertain the viewing direction of the driver and statistically evaluate the viewing direction over time.

Disclosed embodiments provide an improved method and an improved device for assisting a transportation vehicle occupant located in a transportation vehicle.

Disclosed embodiments provide a method and a corresponding device.

In the disclosed method for assisting a transportation vehicle occupant located in a transportation vehicle, user information regarding the behavior and/or the state of a transportation vehicle occupant as well as transportation vehicle parameters of the transportation vehicle is gathered. The gathered user information and transportation vehicle parameters are combined and jointly analyzed. At least one behavior pattern of the transportation vehicle occupant is determined from the jointly analyzed user information and transportation vehicle parameters. The behavior pattern is stored together with the user information. In a subsequent gathering of user information, this user information is compared with the user information regarding the at least one stored behavior pattern. When there is conformance with the behavior pattern, a transportation vehicle function is automatically carried out.

Contrary to the conventional assistance systems which respond in a standardized manner to the input from a transportation vehicle occupant, in particular, the driver, the disclosed method makes it possible to detect or learn individual behavior patterns and, based thereon, to assist the transportation vehicle occupant more efficiently, rapidly, or more comfortably in situations in which a behavior pattern is recognized.

According to at least one disclosed embodiment, when there is a change to a transportation vehicle parameter due to an operation carried out by the transportation vehicle occupant, the user information and transportation vehicle parameters gathered before the operation are analyzed. The analysis and memory outlay can be reduced in this way.

The user information includes the viewing direction and/or the facial expression and/or the orientation of the head of a transportation vehicle occupant.

The method can be applied when user information regarding the driver of the transportation vehicle is gathered.

Correspondingly, a disclosed device for assisting a transportation vehicle occupant located in a transportation vehicle comprises a first sensor for gathering user information regarding the behavior and/or the state of a transportation vehicle occupant and a second sensor for gathering transportation vehicle parameters. Sensor data from the first and second sensors are fed to an analysis and control unit. The analysis and control unit analyzes the sensor data, determines at least one behavior pattern of the transportation vehicle occupant, compares subsequent sensor data from the first sensor with the at least one stored behavior pattern and, if the behavior pattern is recognized, automatically activates a transportation vehicle function. The at least one behavior pattern is stored in a memory unit.

Optionally, the first sensor is a camera sensor in the transportation vehicle, which is oriented toward the transportation vehicle occupant and detects the viewing direction and/or the facial expression and/or the orientation of the head of a transportation vehicle occupant.

The second sensor ascertains one or several of the following transportation vehicle parameters:
  the actuation of an operating element of the transportation vehicle, such as the turn-signal lamp, the steering wheel, the gas or brake pedal;
  the position and/or trajectory of the transportation vehicle.

Likewise, optionally, a third sensor may be provided for detecting transportation vehicle-external objects in the transportation vehicle surroundings and the sensor data from the third sensor are likewise fed to the analysis and control unit and are analyzed thereby.

According to at least one disclosed embodiment, when there is conformance with the behavior pattern, an adaptation of a user interface of the transportation vehicle takes place.

According to yet another disclosed embodiment, when there is conformance with the behavior pattern, a function of a driver assistance system is carried out.

Optionally, the disclosed method or the disclosed device is utilized in a motorized transportation vehicle.

Disclosed embodiments are described in greater detail in the following with reference to the figures, to improve the understanding of the principles of the present disclosure. It is understood that the disclosed is not limited to these embodiments and that the described features can also be combined or modified without departing from the scope of protection of the disclosure as it is defined in the claims.

FIG. 1 schematically shows the method for assisting a transportation vehicle occupant located in a transportation vehicle. According to method operation at 1, a gathering of user information takes place. In principle, arbitrary information regarding the user behavior and/or the user state of a transportation vehicle occupant can be ascertained in this case, provided this information is associated with the use of the transportation vehicle by the transportation vehicle occupant and, in the case that the same operation is carried out multiple times, is identical or at least similar and, therefore, after a learning phase, makes it possible to predict intentions of the transportation vehicle occupant when operations are carried out in the future. It is significant, in this case, to detect the viewing direction, the facial expression and/or the orientation of the head of a transportation vehicle occupant, in particular, of the driver of the transportation vehicle.

In parallel to the gathering of the user information, transportation vehicle parameters are gathered in a method operation at 2. Depending on the application, these can be different types of parameters, such as the actuation of an operating element of the transportation vehicle, such as the turn-signal lamp, the steering wheel, the gas or brake pedal, the trajectory of the transportation vehicle, or the position of the transportation vehicle.

In method operation at 3, the user information and the transportation vehicle parameters are combined and jointly evaluated. In method operation at 4, a behavior pattern is determined therefrom. Provided no behavior patterns were ascertained, for example, in an initialization phase, the behavior pattern is immediately stored in method operation at 5, to allow for a recognition at a later time and, based thereon, to assist the transportation vehicle occupant. However, if one or several behavior patterns have already been learned and stored by the system, a comparison of the presently ascertained behavior pattern with the behavior patterns already present can take place in method operation at 6. If a behavior pattern is recognized in this case, a transportation vehicle function can be automatically carried out in method operation at 7. In this case, for example, a function of a driver assistance system can be carried out or a user interface can be suitably adapted. However, if there is a new behavior pattern that has not been known so far, this behavior pattern is also stored, to enable access thereto in the future.

Exemplary embodiments are mentioned in the following for further illustration.

In the case of a lane change, for example, on the highway, the driver normally glances over his/her shoulder and repeatedly looks in the side-view mirror before he/she carries out the lane change. According to the disclosure, the driver is then observed, for example, by a camera-based eye-tracking system. The glance over the shoulder and the repeated glances into the side-view mirror are detected by the eye-tracking system and are analyzed by suitable image-processing methods.

At the same time, transportation vehicle sensors monitor parameters of the transportation vehicle and detect when the turn signal is activated by the driver. In addition, a lane change of the transportation vehicle can be ascertained, for example, by sensors which detect the steering wheel or tire position, or by a compass function of a navigation system. If it is determined via the sensor data that the transportation vehicle has initially been traveling in a constant direction for a certain period of time, then a brief change in direction associated with the lane change takes place and the transportation vehicle then continues traveling in the original direction, it can be assumed that a lane change has taken place.

A behavior pattern for the lane change can then be ascertained by a combination and a joint analysis of this user information and transportation vehicle parameters. If it is known via the transportation vehicle parameters that a lane change has taken place and the user information yields the finding that the driver has glanced over his/her shoulder and glanced in the side-view mirror before the lane change, this can be stored as a behavior pattern. If it is then ascertained at a later point in time that the driver is glancing over his/her shoulder and in the side-view mirror, this behavior pattern is recognized as being one of the known, stored behavior patterns. The driver assistance system can then respond to the present situation at an early point in time, for example, by way of automatically actuating the turn signal or warning the driver, by a display, for example, on or in the side-view mirror, about a transportation vehicle that is difficult to see or is approaching at a high rate of speed.

The disclosed method can even assist the driver of a transportation vehicle when the driver wants to park the transportation vehicle into a parking space. If the behavior of the driver, transportation vehicle parameters, and, optionally, the transportation vehicle surroundings have been detected in earlier parking maneuvers, the corresponding behavior pattern can be recognized when parking maneuvers are carried out again.

For example, it can be ascertained with the aid of a camera-based eye-tracking system that the driver is looking at the transportation vehicle surroundings through the side windows, the windshield, or the rear window, or, optionally, a side-view mirror. By suitable sensors, for example, ultrasonic sensors, objects in the transportation vehicle surroundings as well as the distance of these objects from the transportation vehicle can be simultaneously detected and provide an indication that the driver has initially placed the transportation vehicle next to a parking space and has then maneuvered into the parking space. In addition, it can be evaluated whether the objects are located in the direction of the detected viewing direction of the driver. In addition, as in the aforementioned example of an application, transportation vehicle sensors can gather parameters of the transportation vehicle such as the actuation of the turn signal, a large steering angle of the steering wheel, typically first in one direction and then in the opposite direction, and whether the transportation vehicle was moved forward or backward as a result. If the behavior pattern which is typical for a parking maneuver is then recognized at the beginning of a new parking maneuver, the parking assistance system can be automatically activated, for example.

Yet another example of an application which is not limited to the assistance of the driver, but rather can also be utilized for other transportation vehicle occupants, in particular, for the passenger, relates to an automatic orientation of a sun visor.

If the eyes of the transportation vehicle occupant are detected, the pupil size can also be ascertained by suitable image-evaluation methods. A suddenly occurring, considerable increase in the pupil size can indicate that the transportation vehicle occupant is blinded. In addition to or instead thereof, a squinting of the eyes can also be registered by the image-evaluation method. If necessary, this information can also be combined with sensor data from a light sensor. If sensors are then additionally provided on the sun visor, which detect a lowering or tilting of the sun visor by the transportation vehicle occupant, the present information can be combined and a corresponding behavior pattern can be determined and stored. If it is established at a later point in time, on the basis of the observation of the eyes of the transportation vehicle occupant, that the transportation vehicle occupant is being blinded again, the sun visor can be automatically oriented, provided suitable actuators are present, without the need for the transportation vehicle occupant to be active therefor.

The behavior patterns of different persons in the above-described examples of an application are usually similar, but are not identical. To increase the accuracy of the assistance system, it can therefore be provided that a decision is made depending on the transportation vehicle occupant during the learning of the behavior pattern and the assistance of the transportation vehicle occupant based thereon. This can take place, for example, by methods for facial recognition, but also on the basis of other biometric methods for personal identification in the transportation vehicle.

Figure 2:
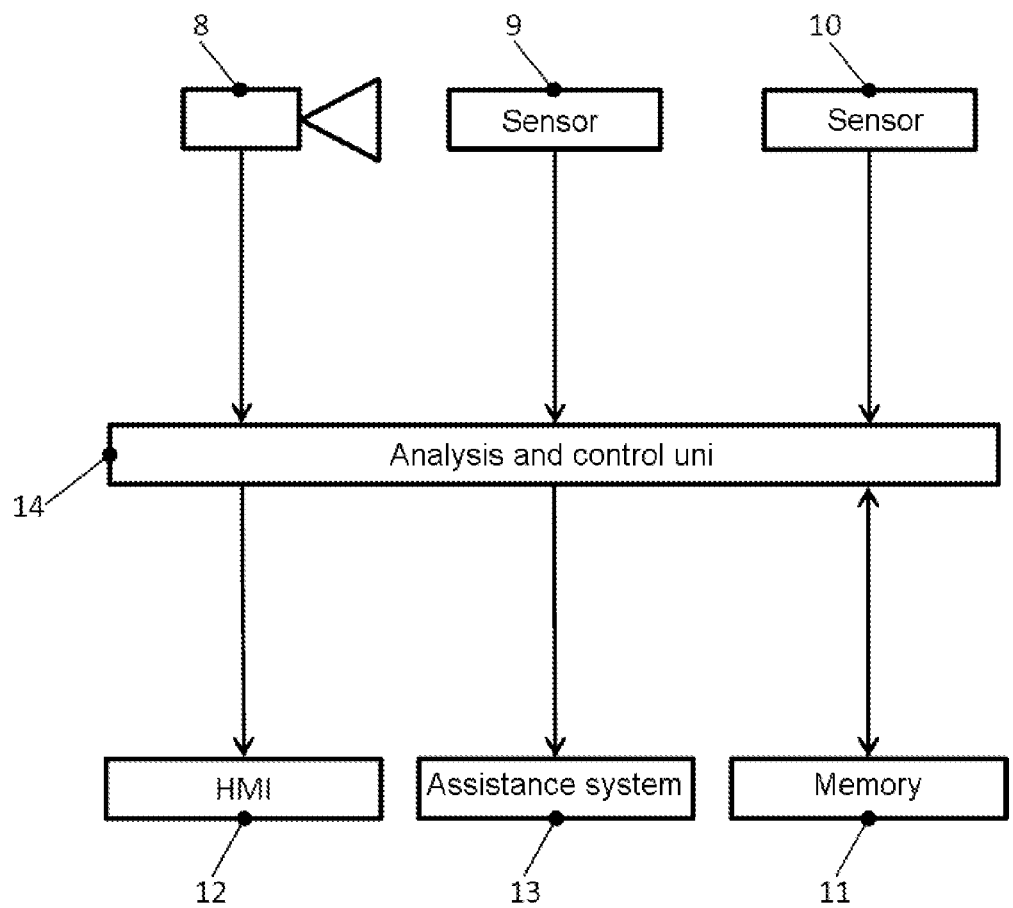
FIG. 2 schematically shows a block diagram of a device.

FIG. 2 schematically shows a block diagram of a disclosed device. A camera 8 arranged in the transportation vehicle interior, for example, in the instrument panel or in the area of the rear-view mirror, detects the head position of the driver and ascertains, by suitable image-evaluation methods, the eye position and viewing direction, but also, optionally, the facial expressions of the driver. This may be a near-infrared (NIR) camera which detects short-wave infrared radiation immediately adjacent to the visible range. In this case, an illumination, in particular, in the dark, can take place by one or several NIR LEDs (not shown), without this being disturbing to the driver or being capable of blinding the driver. The NIR camera and the NIR LEDs can be installed separately or also in one shared sensor component. At least one sensor 9 is installed in the transportation vehicle for gathering the transportation vehicle parameters. In addition, at least one sensor 10 is provided for detecting the transportation vehicle surroundings. The sensor data are fed to an analysis and control unit 14, in which the sensor data are evaluated, to determine behavior patterns, carry out a comparison with known behavior patterns and, depending thereon, to be capable of controlling, for example, an HMI 12 or a driver assistance system 13. A memory 11 is provided for storing the known behavior patterns.

The disclosed embodiments can be utilized in arbitrary areas of automotive engineering.

LIST OF REFERENCE SIGNS 1 method operation including gathering of user information
2 method operation including gathering of transportation vehicle parameters
3 method operation including analysis of the user information and transportation vehicle parameters
4 method operation including determination of a behavior pattern
5 method operation including storing the behavior pattern
6 method operation including checking whether a known behavior pattern is present
7 method operation including carrying out a transportation vehicle function
8 camera for observing the transportation vehicle occupant
9 sensor for transportation vehicle parameters
10 sensor for detecting the transportation vehicle surroundings
11 memory
12 HMI
13 assistance system
14 analysis and control unit

The invention claimed is:

1. A method for assisting an occupant of a transportation vehicle, the method comprising:
receiving, by a controller, first user information captured by a sensor of the transportation vehicle and indicating a behavior and/or a state of the occupant;
receiving data indicating an operating parameter of the transportation vehicle;
analyzing, in response to a change in the operating parameter due to an operation carried out by the occupant, a combination of the first user information and the change in the operating parameter to determine at least one behavior pattern;
storing the first user information and the associated operation to cause the change in the operating parameter as the behavior pattern;
comparing a second user information to the first user information of the at least one stored behavior pattern, wherein the second user information is received subsequent to the receiving of the first user information; and
in response to the second user information corresponding to the first user information of the at least one behavior pattern, automatically perform the operation to cause the change in the operating parameter of the transportation vehicle.

2. The method of claim 1, wherein at least one of the first and second user information includes the viewing direction and/or the facial expression and/or the orientation of the head of a transportation vehicle occupant.

3. The method of claim 1, wherein at least one of the first and second user information is regarding a driver of the transportation vehicle.

4. The method of claim 1, further comprising receiving surroundings information from a third sensor that detects objects external to and surrounding the transportation vehicle, wherein analyzing the combination to determine the at least one behavior pattern includes analyzing the combination of the first user information, the change of the operating parameter, and the surroundings information.

5. The method of claim 1, further comprising, in response to the second user information corresponding to the first user information of the at least one behavior pattern, adapting a user interface of the transportation vehicle consistent with the associated operation of the at least one behavior pattern.

6. The method of claim 1, further comprising, in response to the second user information corresponding to the first user information of the at least one behavior pattern, performing a predefined function of a driver assistance system.

7. A device for assisting an occupant of a transportation vehicle, the device comprising:
   a first sensor for detecting user information indicative of a behavior and/or a state of the occupant;
   a second sensor for detecting operating parameters of the transportation vehicle;
   a memory unit for storing data associated with at least one behavior pattern; and
   an analysis and control unit connected to store and retrieve data in the memory unit and connected to receive detected data from the first and second sensors and configured to:
      in response to a change in at least one of the operating parameters due to an operation carried out by the occupant, analyze a combination of the change in the operating parameter and a first user information captured during the operation to cause the change in the parameter to identify the at least one behavior pattern,
      store, in the memory unit, the first user information and the associated operation to cause the change in the operating parameter as the at least one behavior pattern,
      compare a second user information to the first user information of the at least one stored behavior pattern, wherein the second user information is received from the first sensor subsequent to the first user information, and,
      in response to the second user information corresponding to the first user information of the at least one stored behavior pattern, automatically perform the operation to cause the change in the operating parameter of the transportation vehicle.

8. The device of claim 7, wherein the first sensor of the transportation vehicle is a camera sensor oriented toward the occupant to detect a viewing direction and/or a facial expression and/or an orientation of the occupant.

9. The device of claim 7, wherein the second sensor detects at least one of an actuation of an operating element of the transportation vehicle, and a position and/or a trajectory of the transportation vehicle.

10. The device of claim 9, wherein the operating element of the transportation vehicle is one of a turn-signal lamp, a steering wheel, a gas pedal, and a brake pedal.

11. The device of claim 7, further comprising a third sensor for detecting surroundings information indicative of objects external to and surrounding the transportation vehicle, wherein to analyze the combination to determine the at least one behavior pattern includes analyzing the combination of the first user information, the change of the operating parameter, and the surroundings information.

12. The device of claim 7, wherein the analysis and control unit is further configured to adapt a user interface of the transportation vehicle consistent with the associated operation of the at least one behavior pattern.

13. The device of claim 7, wherein the analysis and control unit is further configured to, in response to the second user information corresponding to the first user information of the at least one behavior pattern, perform a function of a driver assistance system.

14. A transportation vehicle comprising a device for assisting an occupant of the transportation vehicle, the device comprising:
   a first sensor for detecting user information regarding the behavior and/or the state of a transportation vehicle occupant;
   a second sensor for detecting transportation vehicle parameters;
   a memory unit for storing at least one behavior pattern; and
   an analysis and control unit connected to store and retrieve data from the memory unit and connected to receive detected data from the first and second sensors and configured to:
      in response to a change in at least one of the operating parameters due to an operation carried out by the occupant, analyze a combination of the change in the operating parameter and a first user information captured during the operation to cause the change in the parameter to identify the at least one behavior pattern,
      store, in the memory unit, the first user information and the associated operation to cause the change in the operating parameter as the at least one behavior pattern,
      compare a second user information to the first user information of the at least one stored behavior pattern, wherein the second user information is received from the first sensor subsequent to the first user information, and,
      in response to the second user information corresponding to the first user information of the at least one stored behavior pattern, automatically perform the operation to cause the change in the operating parameter of the transportation vehicle.

15. The vehicle of claim 14, wherein the first sensor of the transportation vehicle is a camera sensor oriented toward the occupant to detect a viewing direction and/or a facial expression and/or an orientation of the head of the occupant.

16. The vehicle of claim 14, wherein the second sensor detects at least one of an actuation of an operating element of the transportation vehicle, and a position and/or a trajectory of the transportation vehicle.

17. The vehicle of claim 14, wherein the operating element of the transportation vehicle is one of a turn-signal lamp, a steering wheel, a gas pedal, and a brake pedal.

18. The vehicle of claim 14, further comprising a third sensor for detecting surroundings information indicative of objects external to and surrounding the transportation vehicle, wherein to analyze the combination to determine the at least one behavior pattern includes analyzing the combination of the first user information, the change of the operating parameter, and the surroundings information.

19. The vehicle of claim 14, wherein the analysis and control unit is further configured to adapt a user interface of the transportation vehicle consistent with the associated operation of the at least one behavior pattern.

20. The vehicle of claim 14, wherein the analysis and control unit is further configured to, in response to the second user information corresponding to the first user information of the at least one behavior pattern, perform a function of a driver assistance system.

* * * * *